United States Patent [19]

Chang

[11] 4,060,712
[45] Nov. 29, 1977

[54] NON-CONDENSATION MIRROR

[76] Inventor: Yun-Te Chang, 47, Li Te 11 Road, Lin 8, Ta Te Li Tainan, China /Taiwan

[21] Appl. No.: 753,864

[22] Filed: Dec. 23, 1976

[51] Int. Cl.² .............................................. H05B 1/00
[52] U.S. Cl. ................................................ 219/219
[58] Field of Search ................ 219/219, 202, 200, 201

[56] References Cited
U.S. PATENT DOCUMENTS

| 2,514,647 | 7/1950 | Jolliffe | 219/219 |
| 3,160,736 | 12/1964 | Catterson | 219/219 |

*Primary Examiner*—C. L. Albritton
*Attorney, Agent, or Firm*—Strauch, Nolan, Neale, Nies & Kurz

[57] ABSTRACT

An anti-condensation device having an electric heating element and method whereby said heating element is woven horizontally on an insulation plate and is sufficiently enlarged at the central portion to cause the temperature to be the same at every portion of the mirror face of the mirror in which it is used, and because of the heat produced by the heating element and conducted to the face of the mirror, when this mirror is installed in a bathroom or place where there is much steam and vapor, there is a method to cause the temperature of the reflective surface of said mirror to be 7°-10° C (18° F) higher than that of temperature of the room or the adjacent atmosphere, so that it is possible to prevent water vapor dispersed in the air from condensing on the reflective surface of the mirror.

4 Claims, 5 Drawing Figures

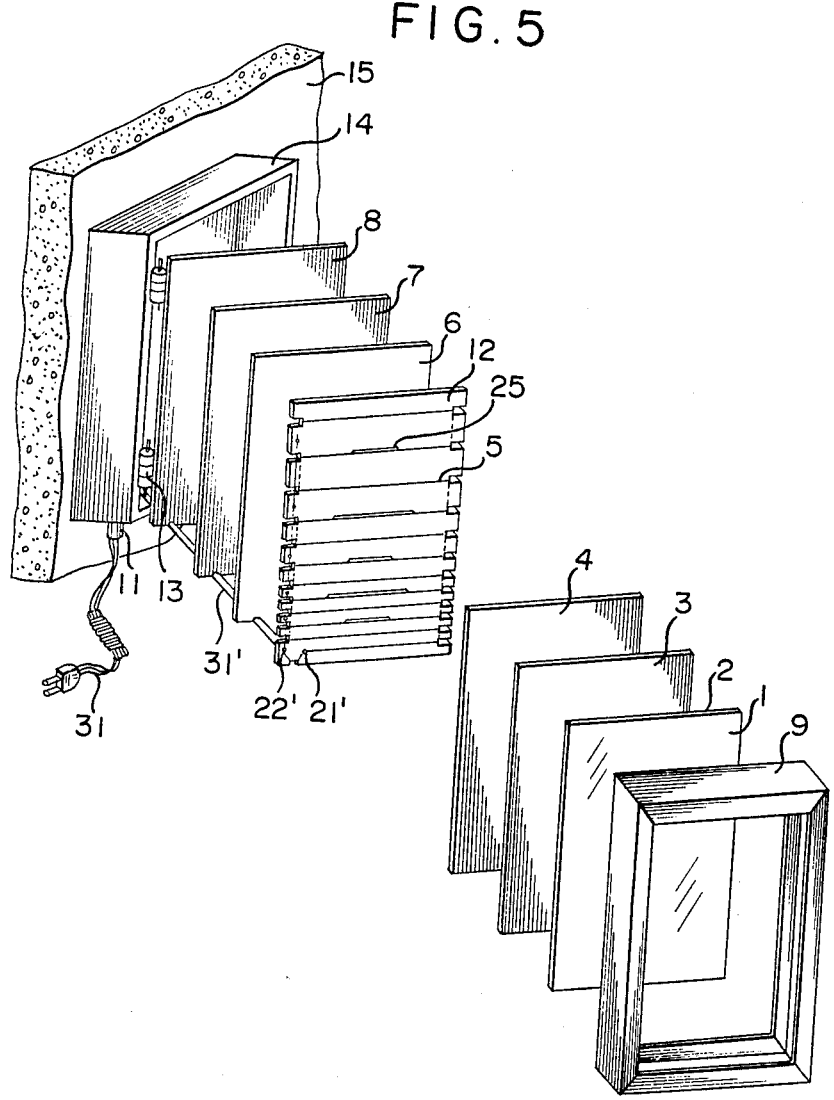

NON-CONDENSATION MIRROR

BACKGROUND OF THE INVENTION

This application is an application of addition to pending application No. 55,763/74 by the same inventor. Due to poor circulation in bathrooms and showers, there is much steam and water vapor dispersed in the bathroom which covers the face of the cosmetic mirror installed in the bathroom in the form of a foggy liquid making the face of the mirror hazy so that the mirror loses its reflecting function. This foggy liquid may also enter the silver plated layer of the mirror. When the mirror has been used for a period of time, the edges and bottom of said mirror will have been corroded, changing the quality of the mirror, and reducing the life of the mirror. The present proposal concerns a non-condensation mirror having an electrical heating element heated by means of electricity, transferring this heat to the face of the mirror causing the temperature of the face of the mirror to be raised to higher than that of the dew point of the water vapor in the air so that no water vapor will be condensed on the face of the mirror nor penetrate the rear of the mirror.

Several prior art devices have been proposed for preventing condensation on bathroom mirrors and the like.

PRIOR ART

The methods whereby the prior art has prevented fog from condensing on mirrors have the following defects:

As shown in U.S. Pat. No. 2,851,433, a light bulb is provided as the heating element, taking up much space. The temperature of the face of the mirror is not uniform. The life of the light bulb has a definite limit to it, meaning that after a short period of time the light bulb must be changed.

The heating element shown in U.S. Pat. No. 3,160,736 is wound vertically so that during use the heating up of the face of the mirror will not be uniform due to the effects of convection thereon. In addition, the type of electrical resistance wire has not been clearly designated.

According to U.S. Pat. No. 3,790,748, the electrical heating element is a coating of one selected from the group of gold, copper, silver, aluminum, chromium, $SnO_2$, $In_2O_3$ and graphite. This would not be easy to manufacture.

U.S. Pat. No. 3,887,788 employs a copper or aluminum printed circuit board as the electrical heating element and must employ a temperature controller, increasing cost.

More important is the fact than none of the above cited disclosures have considered the effects of heat diffusion and convection on the face of a mirror that is hung vertically on a wall during use. The main reasons why a uniform temperature will not be maintained across the face of the mirror during operation are as follows:

1. The upper and lower portion of the mirror will differ in temperature due to the effects of convection.

2. The heat diffusion of the two vertical edges will be greater than that of the center portion therebetween, so the temperature of that center portion will be relatively higher.

All of these defects result in excess heat and wasted energy in addition to operational defects.

SUMMARY OF THE INVENTION

This invention relates to a non-condensation mirror to be installed in the bathroom or a place where there is much steam and vapor, and more particularly to a cosmetic mirror device having a heat conducting plate behind a mirror plate, an electrical heating element, and behind that an electric insulating layer, and a heat insulating layer. Heat produced by the electrical heating element is conducted to the mirror plate by means of the heat conducting plate. When the temperature of the mirror plate is raised higher than the dew point in the air, no steam or vapor will be condensed on the face of the mirror.

The main purposes of this invention are:

1. To provide a mirror device which when used in the bathroom is able to prevent water vapor from dampening the face of the mirror so that the face of the mirror will be clean and clear.

2. To provide a horizontally woven arrangement of the electrical heating element comprising an electrical resistant wire woven horizontally on an electrical insulating plate with the distances between the weavings growing from closer together to farther apart from the bottom of the plate to the top respectively for the purpose of maintaining uniform heat distribution over the face of the mirror.

3. To provide a mirror whereby maintaining the temperature at 7°–10° C higher than the room temperature, not only can antifogging be accomplished, but electricity is saved as well. Also, because the temperature of the mirror is only 7°–10° C higher than room temperature, when people are using the mirror at close range they will not be made uncomfortable by the heat being produced.

BRIEF DESCRIPTION OF THE DRAWINGS

FIG. 5 is an exploded perspective view of a cosmetic mirror provided on a chest assembly.

DETAILED DESCRIPTION OF THE INVENTION

Figure 1:
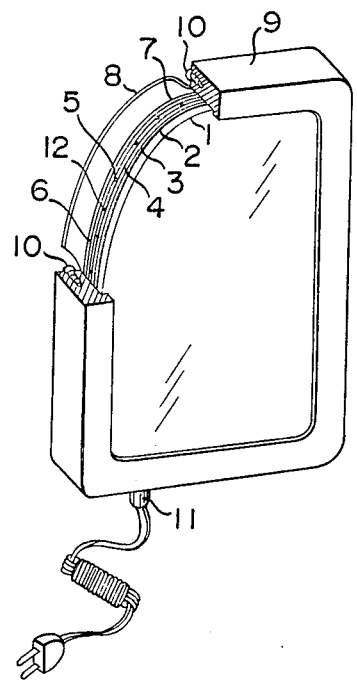
FIG. 1 is a perspective view in section of one embodiment according to the present invention.

As shown in FIG. 1, 1 is a transparent glass plate, 2 is a silver plated member, 3 is a heat conduction plate, 4 is an electrical insulation plate, 5 is an electrical resistance wire, 6 is an electrical insulation plate, 7 is a heat insulating layer, 8 is a support plate, 9 is the frame in which the present invention is installed, 10 is a screw to secure the support plate 8 to the frame 9. 11 is an overload circuit fuse and 31 is an electrical cord. The electrical source flows through cord 31 and the fuse 11 and through the electrical resistance wire 5 so that said resistance wire 5 produces heat which is conducted to the face of the mirror by means of the heat conduction plate 3 to insure anti-fogging. The resistance wire 5 may be made from a choice of either iron or Nichrom according to the size of the mirror. It is decided in accordance with the dimensions of the face of the mirror as to what type of wire is to be used, what its cross sectional area and resistance should be, to cause electrical input to cause the temperature of the face of the mirror to be 7°–10° C than room temperature after an equilibrium of heat exchange between the face of the mirror and the outside air has been attained. According to the Joules effect, when electrical energy is converted to heat (thermal energy) there is the following formula:

$$Q = W - q = (V^2/R) - q$$

wherein:
 $Q$ = energy emanated by the face of the mirror
 $W$ = input
 $q$ = amount of lost energy from the face of the mirror
 $V$ = input voltage
 $R$ = resistance of the heating element $q$ may be considered as a constant. R is also a constant. If the voltage is stable, then Q, or energy emanated by the face of the mirror may be considered to be stable. When starting to use the bathroom and after turning on the hot water tap and hot water vapor is just beginning to be produced, the room temperature of the bathroom may be considered to be equal to that of the adjacent atmosphere. If the temperature of the bathroom is 25° C, the temperature of the face of the mirror will be around 35° C. After the bathroom has been gradually filled with steam, the room temperature of the bathroom will gradually rise in proportion to the condition of circulation in the bathroom, the amount of hot water and the temperature of the hot water. From the formula $Q = \gamma(t_1 - t_2)$ wherein $Q$ is the amount of heat emanating from the face of the mirror, $\gamma$ is the coefficient of heat conduction in the air, $t_1$ is the temperature of the face of the mirror, $t_2$ is the temperature of the bathroom and $Q$ is a constant, $\gamma$ may be considered to be a constant, so $t_1 - t_2$ is a constant, it may be seen that when the temperature of the bathroom $t_2$ is raised the temperature of the face of the mirror will rise with it, so that at any time during usage the temperature of the face of the mirror will be able to be maintained at 7°-10° C higher than the temperature of the air in the bathroom. For this reason, no haze will condense on the face of the mirror.

Figure 2:
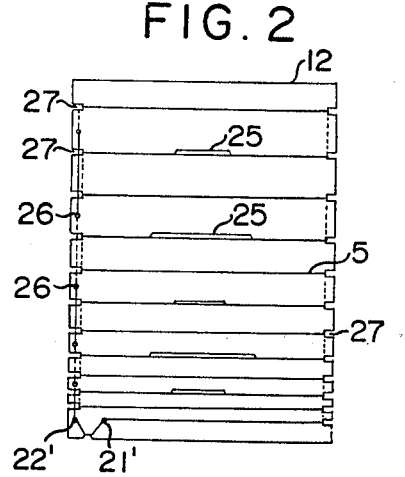
FIG. 2 is a view of the electrical heating element.

FIG. 2 shows the method of the horizontally woven arrangement of the heating element according to the present invention. The electrical heating wire 5 is wound around an insulation plate 12. 21' and 22' are the electrical connection terminals. 25—25 are supplementary electric conductive wires to the parts of the resistance wire 5 located at the central portion of the insulation plate 12. Mounting holes 26—26 are provided along one boarder of the insulation plate 12. The resistance wire 5 may be drawn through these holes 26—26 either from top to bottom or from bottom to top to secure said wire on the insulation plate 12. Notches 27—27 are provided along both sides of the insulation plate to secure the weavings of the wire 5. The advantages of this construction will be explained as follows: The cosmetic mirror is used hanging from the wall. The temperature of the face of the mirror is 7°-10° C higher than that of the ambient atmosphere. The air adjacent the face of the mirror is heated by conduction of the heat of the face of the mirror. When the temperature of said air has been raised, it will proceed to produce convection in the air adjacent to the front of the mirror. The colder air on the one hand absorbs heat emanated from the face of the mirror, and at the same time begins to flow upward. The temperature of the bottom portion of the mirror is comparatively low, the higher up along the face of the mirror, the higher the temperature. If the horizontal arrangement of the heating element is such that the distance of the spaces between the weavings is equal, the amount of heat dissipated over all points of the face of the mirror will be uniform, however, the temperature of the air adjacent to the front of the mirror will be lower at the bottom and higher at the top.

$$Q = \gamma \Delta t$$

$\Delta t$ = the differential temperature between a point on the face of the mirror and the air adjacent thereto.
 $\gamma$ = is the coefficient of heat conduction in the air.
 $Q$ = the amount of heat dissipated at the above said $\Delta t$ point on the face of the mirror.

Figure 4:
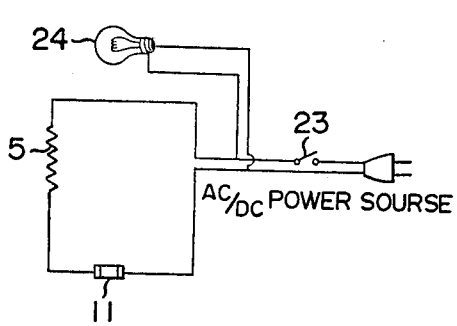
FIG. 4 is a circuit diagram wherein the bathroom mirror is not plugged to the electrical source but is connected directly to the circuit of the bathroom light.
Figure 3:
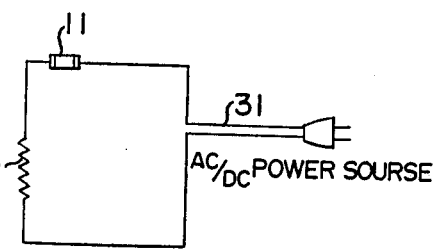
FIG. 3 is a circuit diagram of the present invention.

$Q$ is a constant and $\gamma$ is a constant, so $\Delta t$ is also a constant. For this reason a stable differential temperature will be maintained between the face of the mirror and the air adjacent thereto. The temperature of the air adjacent the bottom portion of the mirror is low, so the temperature of the bottom portion of the mirror is low. The temperature of the air adjacent the upper portion of the mirror is high, so the temperature of the upper portion of the mirror will be high. Taking a mirror 60 cm in height as an example, due to the effects of the convectional flow of the adjacent air, the temperature of upper portion of the mirror will be 3°-5° C higher than that of the lower portion. To solve this defect, as shown in FIG. 2, the distances between lines of the heating element of the lower portion are relatively close together, the farther up, the farther apart the distances between the lines of the heating element, so that during use, the temperature of the face of the mirror will be uniform from the top to the bottom of the mirror. Due to the fact that there is less heat diffusion area at the center part of the mirror than at the sides, the temperature of the center portion will be higher than the sides, decreasing gradually in a pattern radiating from the center to the edges of the mirror. Taking a mirror 60 cm × 45 cm for an example. When temperature of the sides of a mirror reach dew point the temperature of the center of the mirror will be 2°-3° C higher than that of the edges of the mirror. To enable the mirror to maintain a uniform temperature horizontally across the surface thereof, conductive wires 25 may be soldered to the center portions of the heating element 5 to reduce resistance. By controlling the length of the conductive wires 25 and the distance between solderings (each line, every other line, etc.) the amount of heat diffused at the center portion of the mirror will be decreased so that a uniform temperature will be maintained between the sides and center portion, and electricity will also be saved. In FIG. 3 11 is an overload circuit fuse, 5 is a heating element, 31 is an electrical cord. The heating element in FIG. 4 is connected in parallel to the electric light bulb in the bathroom and the switch 23 is provided on a wall outside of the bathroom.

FIG. 6 is a perspective exploded view of the present invention including a cabinet. 1 is a transparent glass plate, 2 is a silver plated layer, 3 is a metal heat conduction plate, 4 is an electric insulating layer, 5 is a heating element woven on an insulating plate 12, 6 is an electric insulating layer, 7 is a heat insulating plate, 8 is a support plate, 9 is a frame for the above said assemblies, 13 is a hinge provided on a cabinet 14 which is hung on a wall 15. 21', 22' are contact terminals of the heating element, 31, 31' are electrical cords, 11 is an overload circuit fuse. The purpose of the invention is achieved by causing the temperature of the face of the mirror to be raised above the dew point of the air by means of conducting heat produced by the heating element to the face of the mirror through a heat conducting plate.

I claim:

1. A non-condensation mirror assembly adapted to be mounted generally vertically in a bathroom or like space wherein there is a relatively high concentration of water particles in the air, said assembly comprising a mirror consisting of a transparent glass plate having a light reflecting layer on its rear surface, and electrical heating means at said rear surface for heating the front surface of said mirror higher than the dew point of the air in said space, said heating means extending substantially coextensively with said mirror and being so constructed and arranged that more heat is imparted therefrom to the bottom portion of the front surface of said glass plate than to the upper portion.

2. In the mirror assembly defined in claim 1, said electrical heating means comprising a heat conductive plate coextensive with said light reflecting layer, an electrically insulating layer rearwardly of and coextensive with said heat conductive plate, and electrical resistance wire carried by said insulating layer, said wire being arranged to provide a multiplicity of vertically spaced transverse windings with the windings at the upper portion of the mirror spaced farther apart than those at the lower part of the mirror.

3. In the mirror assembly defined in claim 2, means in said windings whereby the electrical resistance thereof in the central portion of said assembly is reduced with respect to that at the edges of said mirror for uniform heat distribution substantially horizontally.

4. In the mirror assembly defined in claim 1, the temperature of the front surface of said mirror being always 3°–15° C higher than that of the ambient air when said heating means is energized.

* * * * *